United States Patent [19]

Yarema et al.

[11] 4,291,368

[45] Sep. 22, 1981

[54] PULSE-WIDTH MODULATED INVERTER SYSTEM AND METHOD

[75] Inventors: Raymond J. Yarema, Glen Ellyn; George H. Studtmann, Mount Prospect, both of Ill.

[73] Assignee: Borg-Warner Corporation, Chicago, Ill.

[21] Appl. No.: 25,417

[22] Filed: Mar. 30, 1979

[51] Int. Cl.³ ............................................. H02M 1/12
[52] U.S. Cl. ..................................................... 363/41
[58] Field of Search ............... 318/722, 723, 801, 811; 363/41, 137

[56] References Cited

U.S. PATENT DOCUMENTS 3,611,086 10/1971 Mokrytzki ........................ 363/41 X
3,958,171 5/1976 Sekino .................................. 363/41

Primary Examiner—William M. Shoop
Attorney, Agent, or Firm—James E. Tracy

[57] ABSTRACT

A pulse-width modulated inverter system and a method for operating the same is described for providing three-phase power to a load at a preselectable output frequency and a preselectable output voltage wherein modulated inverter logic control circuitry is provided for activating switching devices to produce waveforms at output terminals having at least one pulse of a variable width disposed symmetrically about the center or 90° point in the middle 60° portion in each half cycle thereof. The width of the pulses are varied continuously to obtain the preselected output voltage. The number of pulses to be added in the middle 60° portion in each half cycle of the waveforms is increased automatically and continuously as the preselectable output frequency is reduced.

20 Claims, 10 Drawing Figures

Fig. 4.
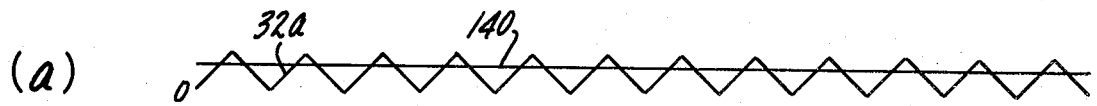
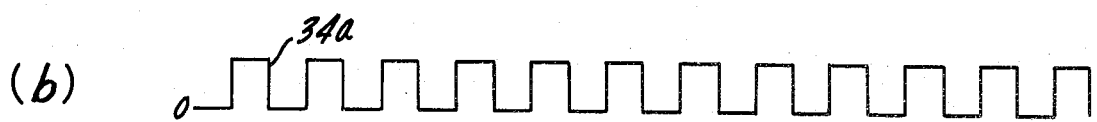
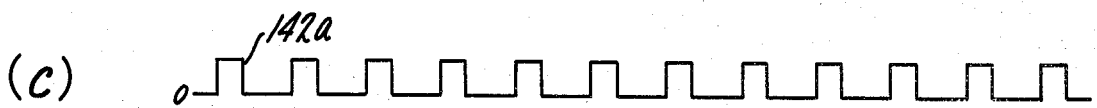
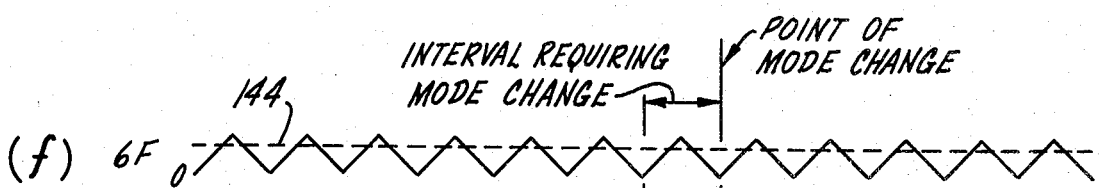
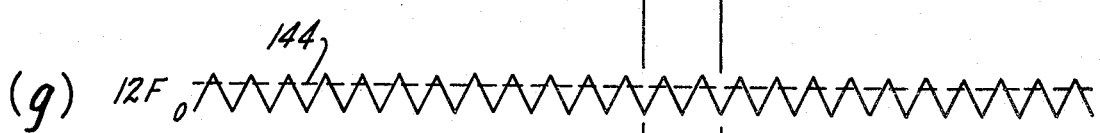
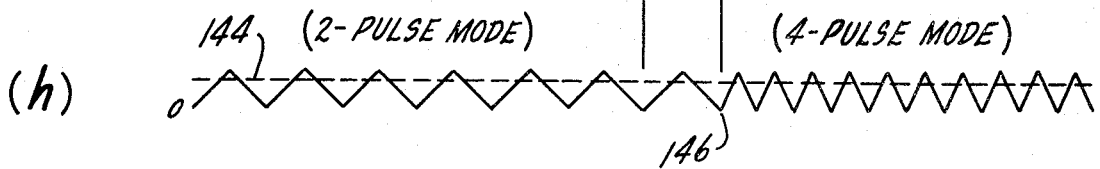

Fig. 4.(cont.)

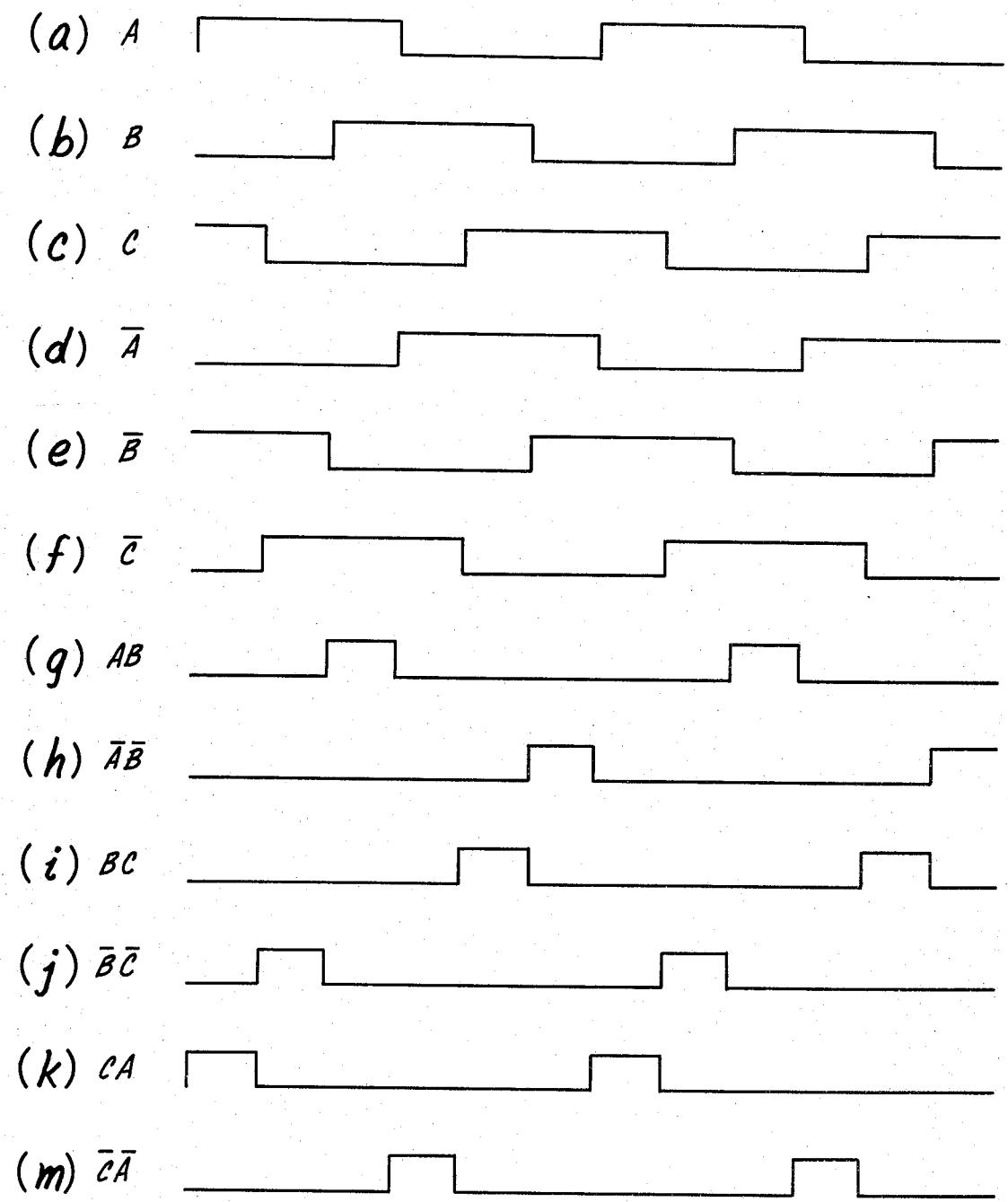

PULSE-WIDTH MODULATED INVERTER SYSTEM AND METHOD

BACKGROUND OF THE INVENTION

1. Field of the Invention

This invention relates generally to static inverters and more particularly, it relates to a new and improved pulse-width modulated inverter system and a method for operating the same.

2. Description of the Prior Art

In U.S. Pat. No. 3,538,420 issued on Nov. 3, 1970 to F. N. Klein, there is shown an inverter for providing a A. C. power at a preselectable frequency and a preselectable voltage by generating a waveform having at least one notch in which the widths of the notches are varied to control the output voltage.

In U.S. Pat. No. 3,611,086 issued on Oct. 5, 1971 to B. Mokrytzki, there is disclosed a pulse-width modulated inverter wherein the modulation frequency is an integral ratio of the carrier frequency and such ratio of the carrier frequency is switched automatically during dynamic changes of the motor speed at synchronized times.

In U.S. Pat. No. 3,739,253 issued on June 12, 1973 to A. J. Humphrey et al, there is disclosed a pulse-width modulated power source for providing a waveform between any two of the output load terminals having an initial, middle, and a final voltage pulse in each half cycle thereof. The initial and final voltage pulses are separated by a 120° duration with the middle voltage pulse occupying a section of this 120° duration.

It is generally known that variations in motor speed of A. C. motors can be effected by suitably controlling the frequency of the applied A. C. voltage. However, frequency changes will alter motor torque which is known to be dependent upon the magnitude-to-frequency ratio of the A. C. voltage applied to the motor. In view of this, there have been many prior art attempts to provide power conversion systems which have not only a variable frequency inverter but has also special circuitry such as pulse-width modulation circuitry to regulate the amplitude of the voltage output of the inverter. The problems encountered by these prior art devices were such that pulse-width modulation circuitry required generally the necessity of separate power switching devices together with the accompanied increase of complex control circuits. It would, therefore, be desirable to provide a pulse-width modulated inverter system which can be effected by a minimum number of power switching devices for both frequency and voltage control.

Another problem that existed in these prior art devices which operated over a wide range of frequencies was that they did not take into consideration at higher frequencies a smaller number of pulses should be added for modulating the inverter output due to large power losses and overheating of the power switching devices. Further, it was generally known that as the width of the pulses increased for reducing the output voltage the magnitude of the harmonic content, especially low order harmonics, in such output voltage is increased for a given fundamental voltage thus increasing heating of the motor. Thus, it would be desirable to provide a pulse-width modulated inverter system wherein a minimum number of pulses with the narrowest allowable width are added to the output waveforms at the highest inverter frequency thereby eliminating overheating of the power switching devices. In the present invention as the frequency is decreased the pulse-width is increased continuously for reducing the output voltage until a preselected limit is reached where excess motor heating might be caused by the increased harmonic content. Then, the number of pulses is increased but without changing the total pulse-widths so as to maintain constant the fundamental voltage and yet shifts the harmonics to a higher frequency to decrease motor heating. This process is repeated continuously with additional pulses as the frequency is further reduced.

SUMMARY OF THE INVENTION

Accordingly, it is a general object of the present invention to provide a new and improved pulse-width modulated inverter system which overcomes each and every one of the difficulties encountered in the prior art systems referenced to above.

It is an object of the present invention to provide a pulse-width modulated inverter system and a method for operating the same which can be effected by a minimum number of power switching devices for both frequency and voltage control.

It is another object of the present invention to provide a pulse-width modulated inverter system wherein a single pulse with the narrowest allowable width is added in each half cycle of the output waveforms at the highest inverter frequency thereby eliminating overheating of the power switching devices.

It is another object of the present invention to provide a pulse-width modulated inverter system wherein as the inverter frequency is decreased the pulse-width of the pulses added to the output waveforms is increased continuously for reducing the output voltage until a preselected limit is reached where excess motor heating might be caused by the increased harmonic content and whereupon the number of pulses added is increased but without changing the total pulse-widths so as to maintain constant the fundamental voltage and yet shifts the harmonics to a higher frequency to decrease motor heating.

It is still another object of the present invention to provide a pulse-width modulated inverter system wherein the voltage control is produced by changing the number and widths of the pulses added to each of the gate signals driving the power switching devices as a function of the inverter frequency.

It is yet still another object of the present invention to provide a pulse-width modulated inverter system wherein the output waveforms of the inverter are modulated by adding at least one pulse of a variable width disposed symmetrically about the center or 90° point in the middle 60° portion in each half cycle of the output waveforms.

Briefly, in accordance with the aims and objectives of the present invention there is provided a pulse-width modulated inverter system and method for providing three-phase power to a load at a preselectable output frequency and a preselectable output voltage wherein voltage control of the inverter output is accomplished by modulating the output waveforms. To this end, a power supply is provided with a positive and a negative supply terminal, and switching means operatively connects the power supply to a load having A, B, and C output terminals. Pulse-width modulated logic control circuitry is provided for activating or triggering the switching means to produce waveforms at the output terminals so that at least one pulse of a variable width is disposed symmetrically about the center or 90° point in the middle 60° portion in each half cycle of the waveforms. The control circuitry includes a pulse-mode logic device for selecting and changing the number of pulses to be added in the middle 60° portion in each half cycle of the waveforms in response to a control signal having a value which is a function of the preselected output frequency. The control logic circuitry further includes a comparator for generating the pulses to be added and for varying the widths of pulses in response to the control signal so that the width is varied continuously thereby obtaining the preselected output voltage.

BRIEF DESCRIPTION OF THE DRAWINGS

These and other objects of the present invention will become more fully apparent from the following detailed description when read in conjunction with the accompanying drawings, in the several figures of which like reference numerals have been employed throughout to designate the like parts, and wherein:

FIGS. 4 and 5 show timing diagrams illustrating the operation of the system of this invention;

DETAILED DESCRIPTION OF THE PREFERRED EMBODIMENT

Figure 1:
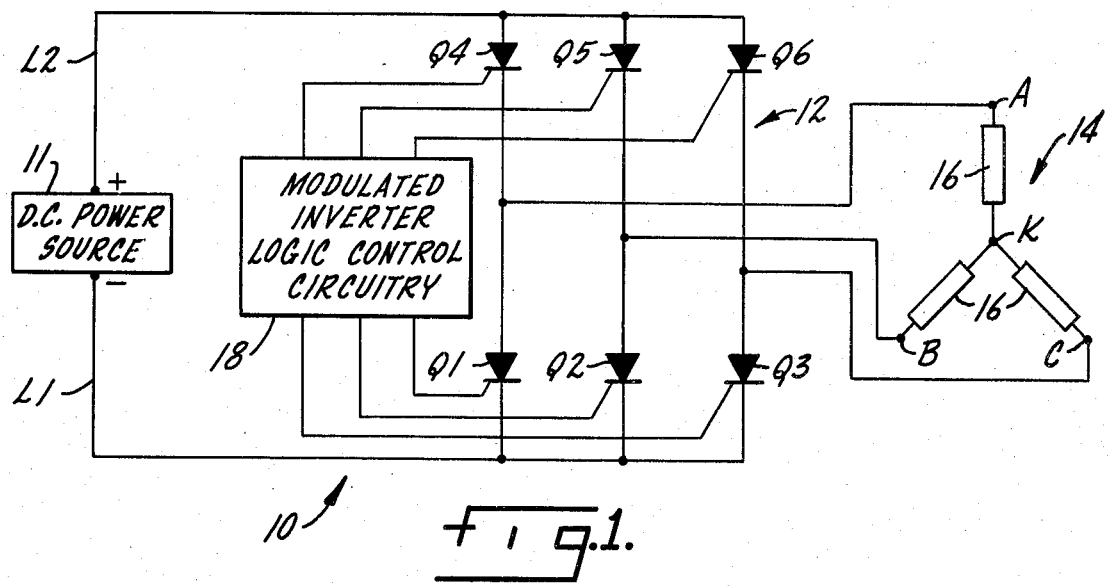
FIG. 1 is a simplified schematic circuit diagram of a preferred embodiment in accordance with the present invention.

Referring now to FIG. 1, there is shown a simplified schematic circuit diagram of a preferred embodiment of the pulse-width modulated inverter system designated generally by reference numeral 10. The inverter system receives power from a D.C. power source 11 through supply leads L1 and L2 and is inverted by a three-phase inverter bridge 12 to provide three-phase alternating current at output terminals A, B and C for driving a polyphase load 14. The load is illustrated as Y-connected motor windings 16 having a common terminal denoted by K. This load is not restricted to a Y load as depicted in FIG. 1, but can also take the form of a delta-connected load.

Figure 3:
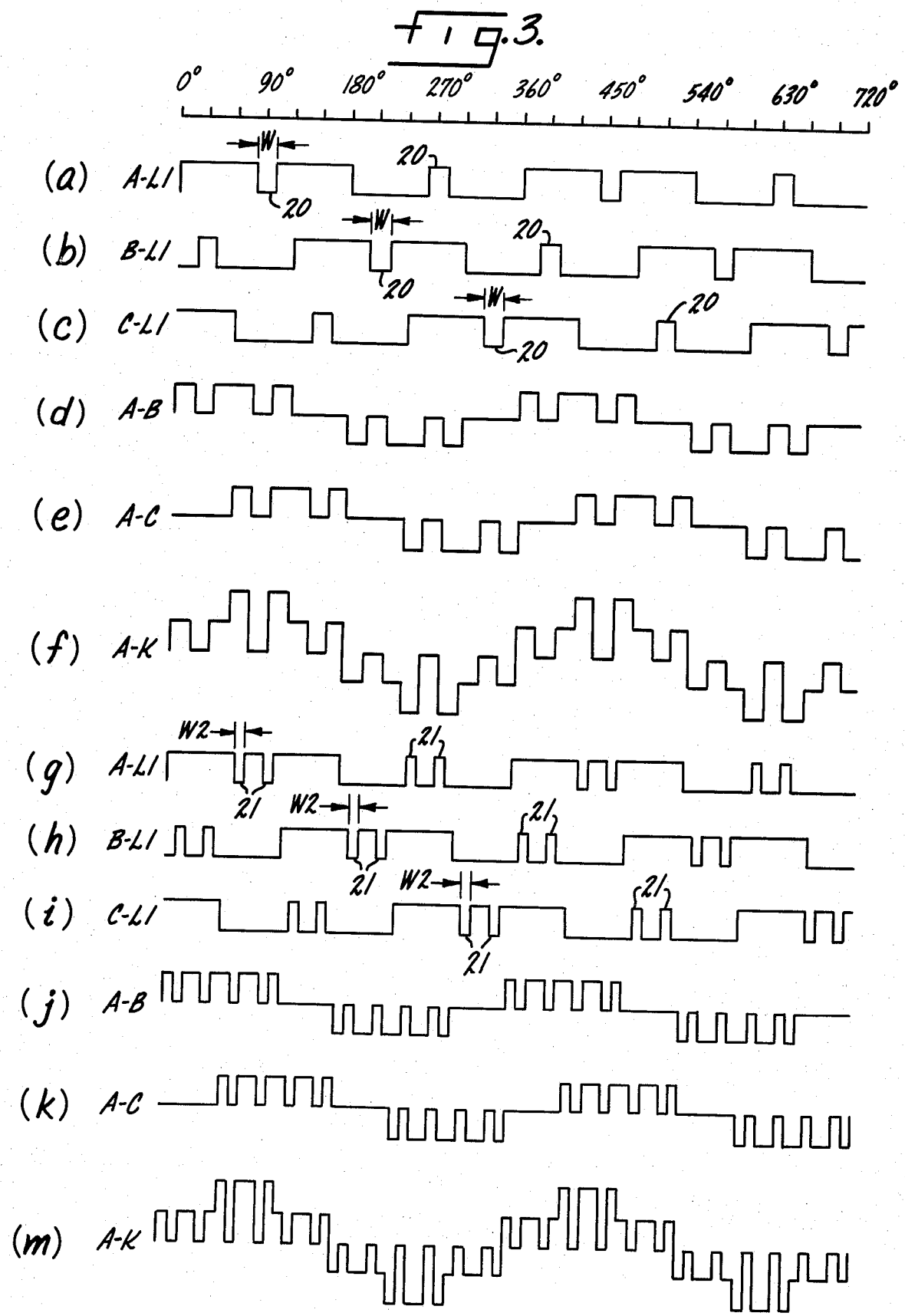
FIG. 3 shows waveforms which are provided by the system of FIG. 1 when modulated by the control logic means of the present invention.

The inverter bridge 12 consists of six silicon-controlled rectifiers (SCRs) Q1 through Q6 or their functional equivalents such as transistors and thyristors defining power switching means for applying selectively either a negative voltage through the lead L1 or a positive voltage through lead L2 to each of the output terminals A, B and C. The conduction sequence and intervals of the rectifiers Q1 through Q6 are controlled by modulated inverter logic control circuitry 18 connected to the gates thereof to provide a square wave pulse pattern at the output terminals A, B and C in accordance with the invention and as illustrated in FIG. 3.

Figure 2:
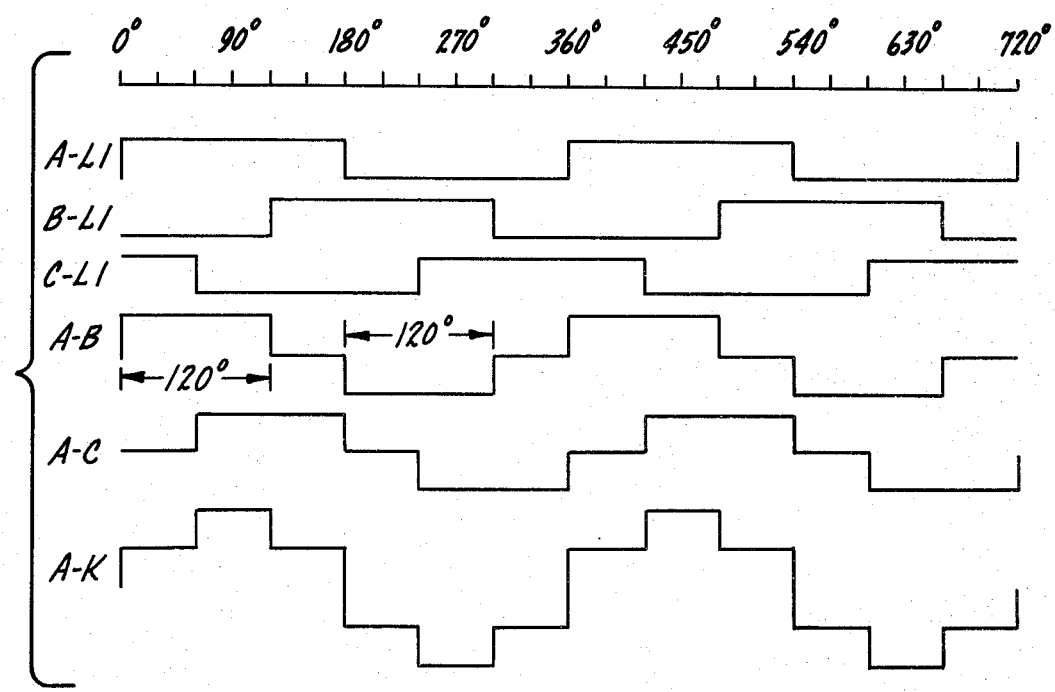
FIG. 2 shows various waveforms which are generated by the system of FIG. 1 when it is operated in an unmodulated manner well-known in the prior art.

By way of background and with reference to FIG. 2, there are illustrated the various waveforms produced at the output terminals A, B and C when the inverter bridge 12 is operated typically in the prior art, i.e., the logic control circuitry 18 providing unmodulated triggering pulses to the gates of the rectifiers Q1 through Q6. The waveforms are produced with respect to the lead L1 and are designated A-L1, B-L1 and C-L1 respectively. As can be seen, the waveform B-L1 is identical to the waveform A-L1 but is lagging the same by 120°. The waveform C-L1 is identical to the waveform A-L1 but is lagging the same by 240°. Waveform A-B illustrates the quasi-square wave output voltage which appears between the A and B output terminals, and waveform A-C illustrates the quasi-square wave output voltage which appears between the A and the C output terminals. The waveforms A-B and A-C are referred to as line-to-line voltages. The sum of the waveforms A-B and A-C yields a resultant waveform A-K referred to generally as a phase-to-neutral voltage. Similar voltages exist between the terminals B and K and terminals C and K for the respective phases B and C which are not shown.

This waveform A-K approximates closely a sine waveform and provides reasonable satisfactory operation of a three-phase A. C. motor. The speed of the motor is controlled by varying the A. C. output frequency which is accomplished by triggering of the gates of the various rectifiers Q1–Q6 in a given sequence at a prescribed rate, while the output voltage is varied by commutating the rectifiers at intermediate times. As is generally known by those skilled in the art, the effective A. C. output voltage remains substantially constant when the output frequency is varied if a fixed D. C. source is utilized. However, the efficient operation of the A. C. motor at different output frequencies requires that the amplitude of the output voltage vary as a function of the frequency.

In accordance with the present invention, FIG. 3(a)–3(c) depict the addition of a pulse or notch 20 within each half cycle of the output potential of the inverter bridge 12 of FIG. 1 at terminals A, B and C with respect to the negative supply lead L1 when the gates of the SCRs are operated with suitable triggering pulses. It is noted that instead of a voltage remaining at a discrete level for 180° of a cycle, the single notch or pulse 20 having a width W is taken out symmetrically about the center or 90° point in the middle 60° portion of each half cycle which interrupts the continuity of the applied C.C. voltage. Again, these three waveforms are identical except being displaced in phase by 120° from each other. This operation of introducing two pulses per cycle at the output terminal is referred to as a 2-pulse mode. The line-to-line voltage between terminals A and B is substantially as represented in FIG. 3(d), and the line-to-line voltage between the terminals A and C is shown in FIG. 3(e). The phase voltage at phase A of the Y-connected load is substantially as represented in FIG. 3(f). While the waveform in FIG. 3(f) is difficult to visualize due to its relative complexity, it can be shown by mathematical analysis that the average energy content for effective A.C. output voltage of this waveform approximates closely a sine wave distribution.

As previously noted, the A. C. output frequency may be varied by triggering the rectifiers Q1 through Q6 in a given sequence at different rates. Further, by varying the widths of the pulse 20, the effective A. C. output voltage of the waveform in FIG. 3(f) can also be varied. In other words, by increasing the width of the pulse the effective A. C. output voltage is reduced and conversely, by decreasing the width of the pulse the effective output voltage is increased. By harmonic analysis, it can be shown that as the width of a pulse becomes larger the lower order harmonic content in the waveform increases in magnitude for a given fundamental voltage thereby resulting in a greater motor heating. Further, it is noted that by increasing the number of pulses without changing the total widths of the pulses for each half cycle the harmonics are shifted to a higher frequency with a resultant decrease in harmonic currents and thus motor heating. Therefore, it is found that for operation of a motor over a wide speed range it is necessary to add more than one pulse for each half cycle.

In order to minimize the commutation or switching rate and thus switching losses in the SCRs of the inverter, only one notch or pulse having a minimum allowable width is added for each half cycle (2-pulse mode) at the highest inverter output frequency and maximum output voltage. At the output frequency is decreased, the pulse-width is increased so as to reduce the fundamental output voltage until a predetermined limit is reached which is determined by excess motor heating due to the increased lower order harmonic content and minimum pulse width limitation. Then, the operation is automatically changed to a 4-pulse mode but not a change in the total pulse widths so as to maintain a constant fundamental voltage before and after the switch. This process is repeated continuously to higher pulse modes at the output frequency is further reduced.

FIG. 3(g)–3(i) shows the output waveforms of the inverter 12 of FIG. 1 at terminals A, B and C where four pulses are added per cycle for the 4-pulse mode operation. For the purpose of ease of illustration, the frequency in FIG. 3(a)–3(f) is the same as in FIG. 3(g)–3(m) notwithstanding the pulse mode change. The line-to-line voltage between the terminals A and B is substantially as represented in FIG. 3(j), and the line-to-line voltage between the terminals A and C is shown in FIG. 3(k). The phase voltage at phase A of the Y-connected load is substantially as represented in FIG. 3(m). It should be noted that the pulses 21 all occur in the middle 60° portion of each half cycle evenly spaced or symmetrically disposed about the 90° point and each of the pulses 21 are of equal pulse-width W2 or one-half of W. It should be apparent to those skilled in the art that similar waveforms can be generated for higher pulse mode operations such as 6, 8, 10 and so on.

Figure 6:
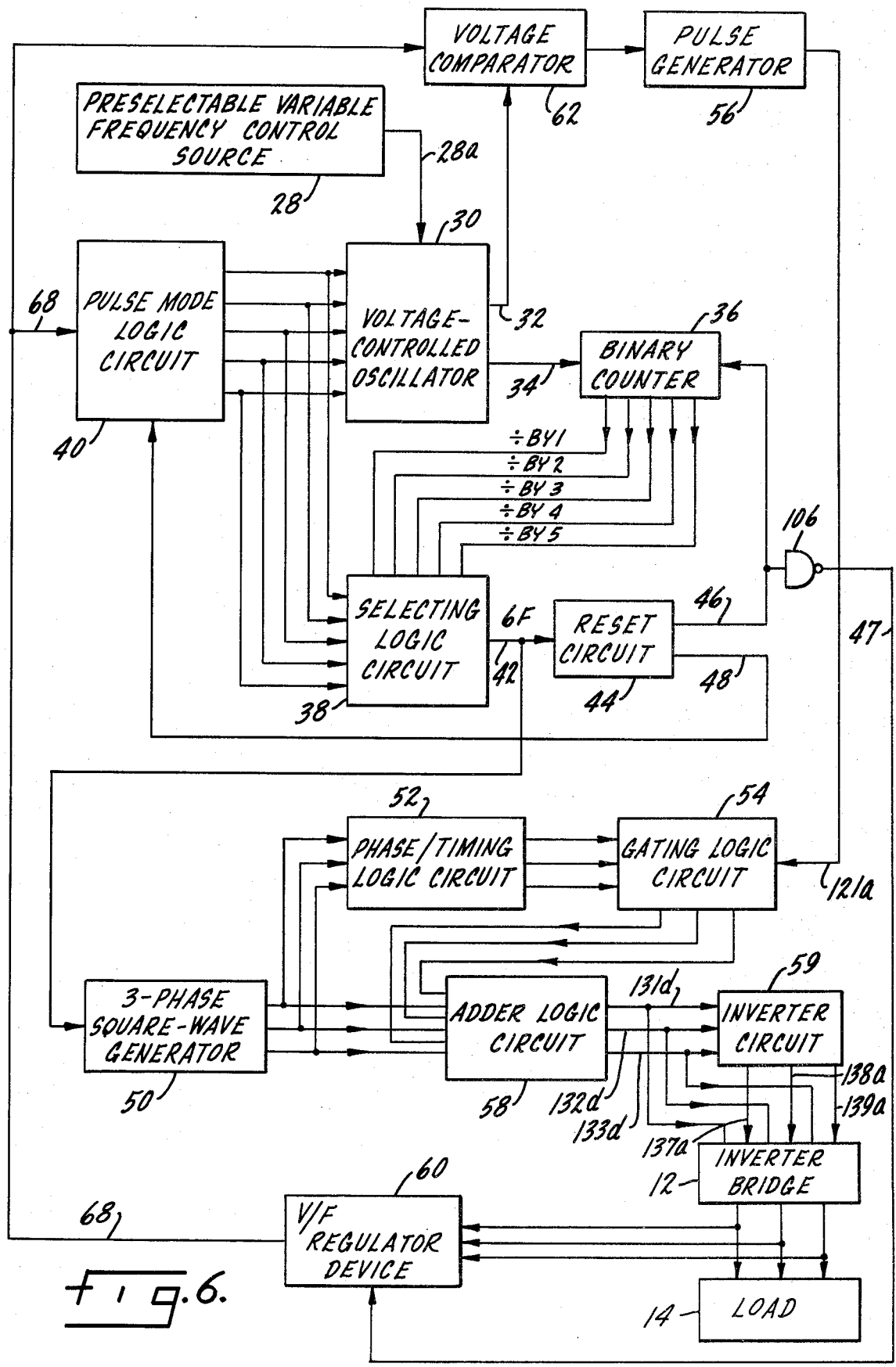
FIG. 6 is a block diagram of the modulated inverter control circuitry of this invention.

In the practice of the present invention, the pulse mode of operation and the width of the pulses added are precisely controlled by digital logic circuitry of the type shown in FIG. 6. The block diagram of FIG. 6 illustrates in more detail the modulated inverter logic control circuitry 18 of FIG. 1 for driving the three-phase load 14 employing the inverter bridge 12 which provides A. C. power at a preselectable frequency and a preselectable effective output voltage utilizing the technique just described with reference to FIG. 3(a) through 3(m).

Figure 4:
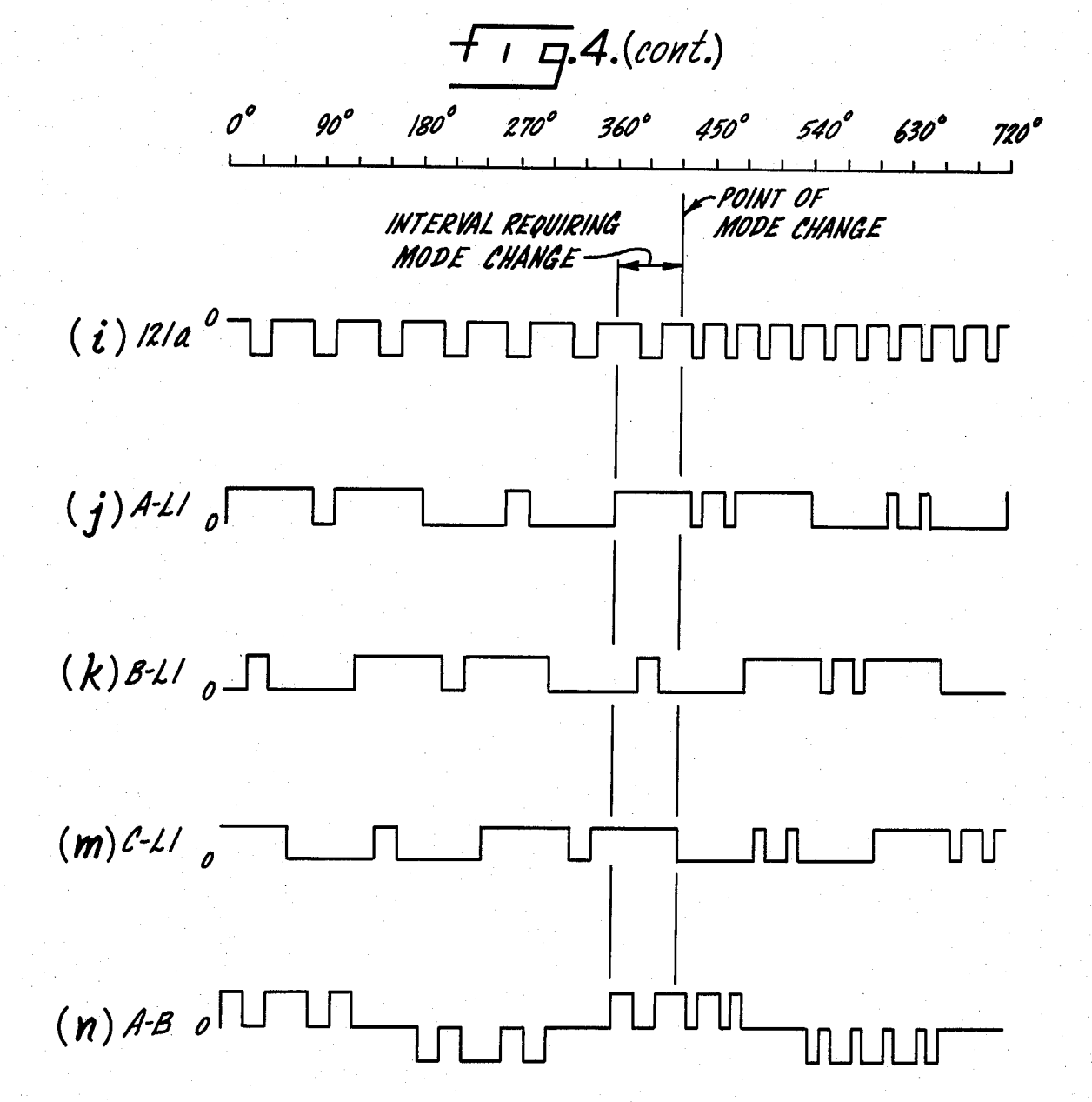

A selectively variable frequency control source 28 provides a D. C. voltage signal which is directly proportional to six times the preselected A. C. output frequency. This signal is applied to a voltage-controlled oscillator 30 to generate a triangular waveshape 32a shown in FIG. 4(a) at output 32 and a square wave 34a shown in FIG. 4(b) at output 34. Both the triangular waveshape 32a and the square wave 34a are of the same frequency (one cycle for each 60° interval in the 2-pulse mode) which is an integer multiple of six times the preselected A.C. output frequency and are in a phase relationship to each other as shown. A binary counter 36 counts down from a relatively high frequency produced by the oscillator 30 to provide a signal divided by one of several factors, i.e., one to five. The desired factor is chosen by a selecting logic circuit 38 which receives input signals from a pulse mode logic circuit 40. The logic circuit 40 functions to select and to change the number of pulses to be added to each half cycle of the waveforms at the inverter outputs by changing the signal on one of a plurality of outputs fed to the oscillator 30 and to the selecting logic circuit 38. The frequency of the signal 42a shown in FIG. 4($b^1$) at the output 42 of the logic circuit 38 is six times a preselected fundamental or modulation frequency F which is produced at the output terminals A, B, and C. This signal 42a represents phase within a corresponding cycle portion of the inverter output cycle. In other words, there are six cycles at this point for each cycle of the inverter output frequency and each of the six cycles correspond to a 60° interval in the inverter output. The signal 42a drives a reset circuit 44 having an output 46 to reset the counter 36 after the end of each 60° interval and to allow a change in the pulse mode operation, if required, by output 48 connected to one input of the logic circuit 40. The signal 42a drives also a 3-phase square wave generator 50 which provides gate drive or triggering signals for a conventional unmodulated inverter bridge with the waveforms A-L1, B-L1 and C-L1 of FIG. 2.

These signals from the generator 50 are combined by a phase/timing logic circuit 52 to provide various timing signals which determine the controls of each operational event in each of the phases at different times. The logic circuit 52 drives a gating circuit 54 which allows one or more pulses from a pulse shaper or pulse generator 56 to be gated to the appropriate phases at the correct times. Adder logic circuit 58 sums the gate pulses from the generator 56 to the unmodulated triggering signals from the square wave generator 50 to generate modulated gate signals for the rectifiers Q1, Q2 and Q3 respectively in the inverter bridge 12. The modulated gate signals from the logic circuit 58 are inverted by inverter circuit 59 to produce modulated gate signals for the other rectifiers Q4, Q5 and Q6 in the inverter bridge.

A conventional means for sensing the magnitude-to-frequency ratio (V/f) of the output voltage, such as V/f regulator device 60, is connected to the inverter bridge 12. One such V/f regulator device is disclosed in U.S. Pat. No. 3,343,063 issued to M. F. Keeney, Jr. et al on Sept. 19, 1967. The device 60 receives another input signal from the logic circuit 38 via reset circuit 44 and NAND gate 106, the output frequency of the logic circuit 38 being variable and is controlled by the oscillator 30. Thus, the device 60 functions as a regulator to generate a voltage control signal proportional to the inverter output voltage divided by the inverter fundamental output frequency. Since the frequency of the oscillator 30 is controlled by the frequency control source 28, this source 28 is used to change selectively the output frequency of the inverter. As the frequency control source changes, the output from the regulator device 60 is changed which, in turn, changes the width of the pulses from the generator 56 via a voltage comparator circuit 62. As a result, the inverter output voltage will be automatically changed and regulated as necessary to maintain as nearly as possible whatever V/f value is predetermined by the setting of the frequency control source. The output from the device 60 is sent also to the logic circuit 40 which determines when a different pulse mode operation is required by controlling the frequency of the oscillator 30 to run at various multiple of six times the fundamental frequency. This multiplying factor as determined by the logic circuit 40 is equal to the number of pulses to be added in the middle 60° interval of each half cycle in the signals at the inverter output terminals. The voltage comparator 62 compares the triangular wave 32a from the oscillator 30 and the voltage control signal from the device 60 for generating a signal to the pulse generator 56. The pulse generator 56 shapes the signal and ensures that pulses below some minimum width are not generated.

While the various blocks 30, 36, 38, 40, 44, 50, 52, 54, 56, 58, 59, and 62 may take various forms, suitable logic circuitry for providing the timing and sequencing of the switching events in accordance with the present invention is illustrated in FIGS. 7 through 10. The logic circuits, which may be relatively complex in their detailed functions, may be constructed through the use of integrated circuits to be reliable, compact and relatively inexpensive. Even though these schematics are believed to be self-explanatory to those skilled in the art in view of the previous explanation, a brief description of the operation of each is believed to be in order. The various logic components are represented symbolically in a conventional manner with positive logic being assumed. It will be understood that many alternative elements and values may be employed in constructing these logic circuits in accordance with the present invention.

Figure 7:
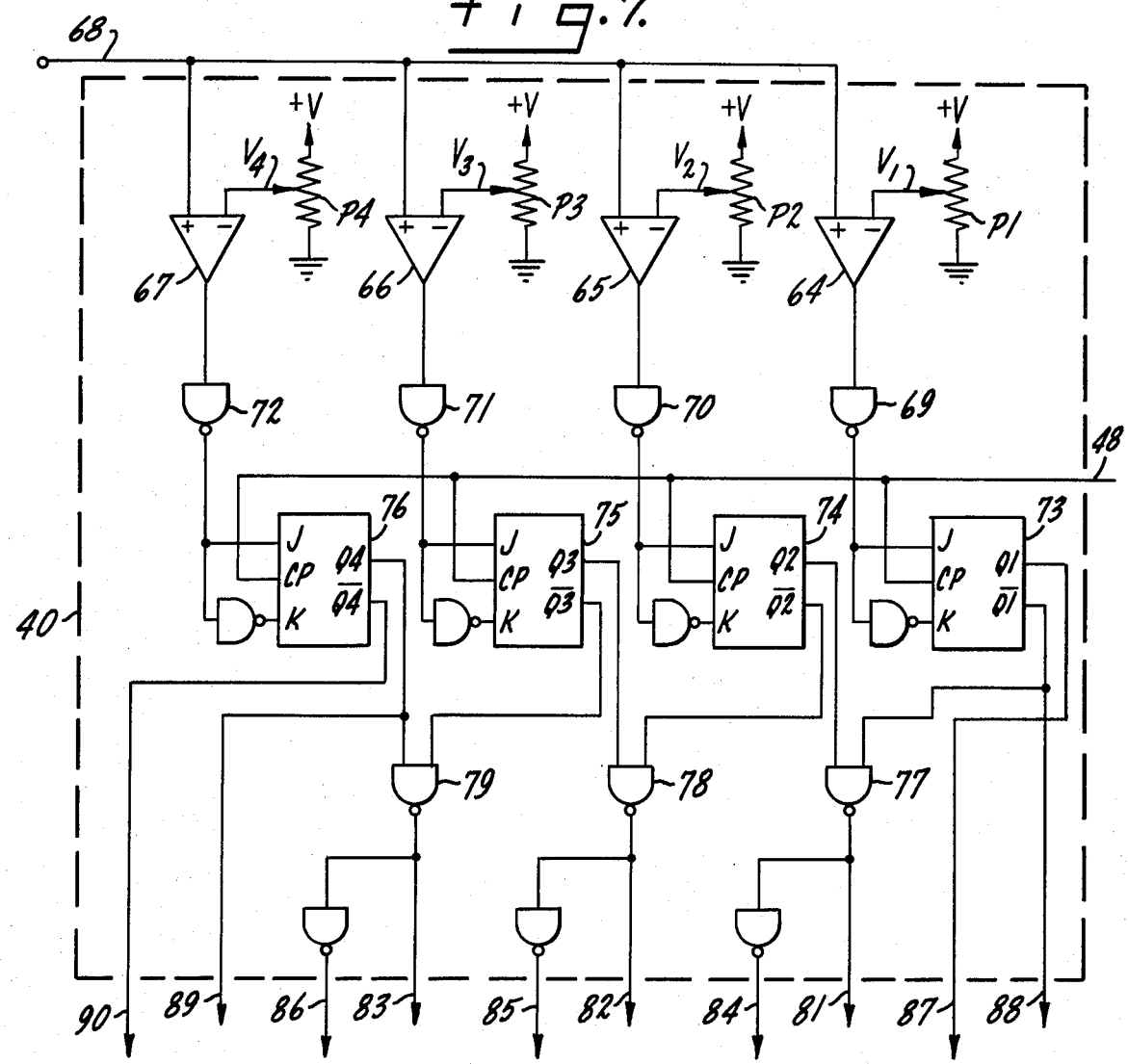
FIGS. 7–10 are detailed circuit diagrams of the various blocks shown in FIG. 6.

Referring now to FIG. 7, there is shown a schematic diagram of a preferred embodiment of the pulse mode logic circuit 40 which determines the number of pulses to be added in the middle 60° interval in each half cycle of the inverter output waveforms. The output signal from the regulator device 60, which is a D. C. signal proportional to the inverter output voltage, is applied to each operational amplifier 64, 65, 66 and 67 via line 68. Each of the amplifiers 64–67 is pre-biased at set switch points by voltages V1 through V4 via potentiometers P1 through P4. The voltage V1 may have a value of, for example, 1 volt which corresponds to the lowest inverter output frequency. The voltages V2, V3 and V4 may have a value of 2, 3 and 4 volts, respectively. The voltages V1 through V4 are reference signals which are related to the modulation frequency so that the oscillator output frequency is caused to run at a desired integer multiple thereof. Each of the amplifiers 64–67 functions as a comparator comparing the D. C. signal proportional to the inverter output voltage with the present bias points. For example, when this D. C. signal exceeds the bias potential of one volt set by P1, then there is an output from the amplifier 64 which is at a high level or logic "1". Similarly, when the D. C. signal from the regulator device 60 exceeds 2 volts, 3 volts and 4 volts, then there is a logic "1" at the output of amplifiers 65, 66 and 67, respectively. Each of these outputs is connected to respective NAND gates 69, 70, 71 and 72 which acts as buffer amplifiers and inverters. The output of the gates 69–72 are applied to the input terminals of four flip-flops 73–76 of the so-called J-K type. The output signals from the reset circuit 44 via line 48 is applied to the clock pulse or CP terminal of J-K flip-flops 73–76 to act as a transfer signal to effect a reading in of information from the comparators 64–67 at the end of a 60° interval.

The output signals Q2 through Q4 and the complements $\overline{Q1}$, $\overline{Q2}$ and $\overline{Q3}$ are connected to NAND gates 77, 78 and 79 whose outputs are on lines 81, 82 and 83, respectively. The complements of these latter signals are on lines 84, 85 and 86. The output signals Q1, $\overline{Q1}$, Q4 and $\overline{Q5}$ are provided to respective lines 87, 88, 89 and 90.

Figure 8:
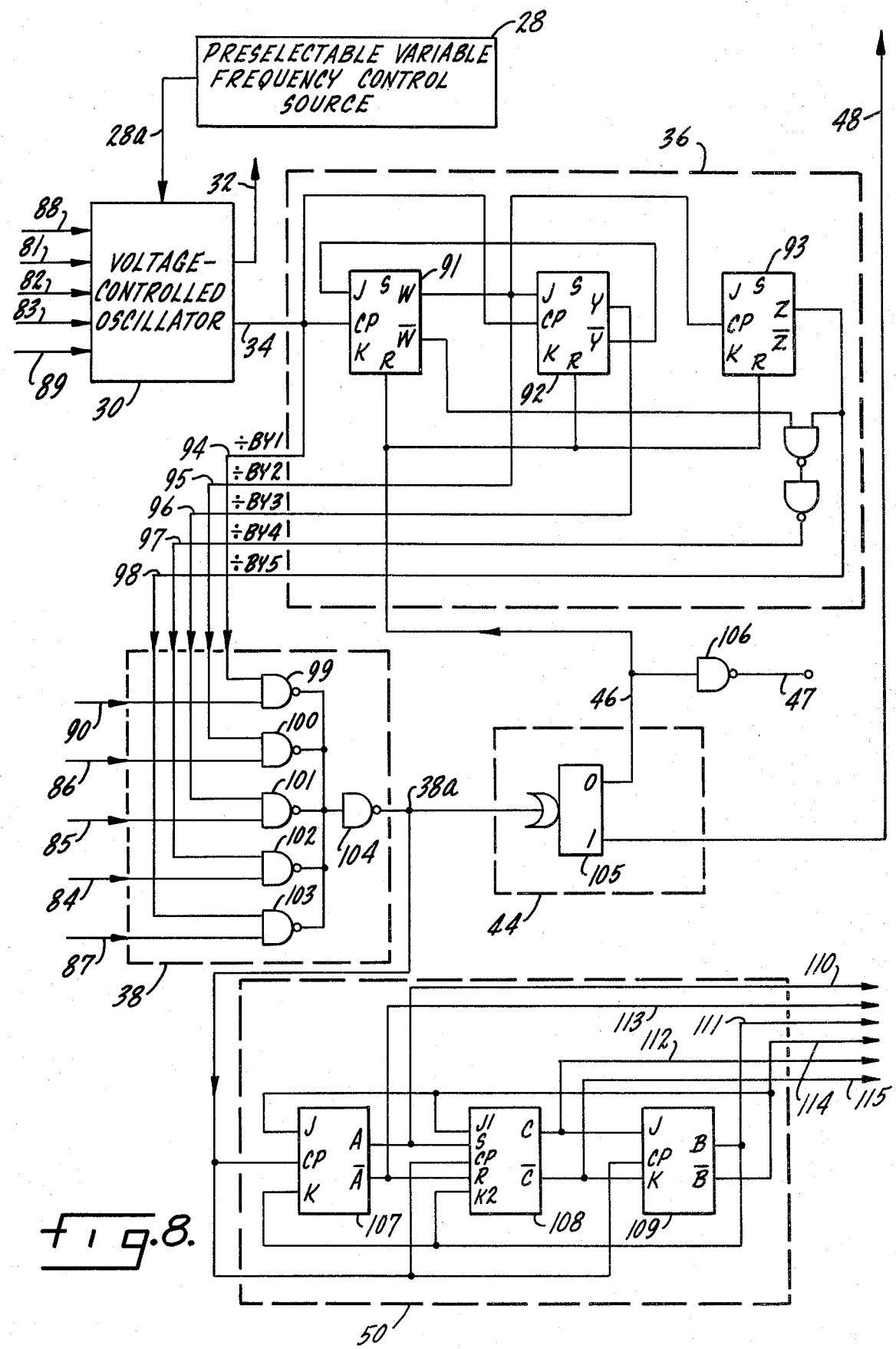

In FIG. 8, there is shown a more detailed circuitry of the preferred embodiment of the binary counter 36, the selecting logic circuit 38, the reset circuit 44 and the three-phase square wave generator 50. The oscillator 30 generates the triangular wave at output 32 and the square wave at output 34 as previously stated. The frequency of the triangular wave and the square wave are equal and is an integer multiple of six times the fundamental frequency F, the frequency F being set by the control source via line 28a. The integer multiple is determined by the signals received on the oscillator inputs from lines 88, 81, 82, 83 and 89 on the pulse mode logic circuit 40. The square wave output on line 34 is connected to the binary counter 36 which functions as a divide-by-N circuit composed of three J-K flip-flops 91, 92 and 93 whose outputs are on lines 94 through 98. The output frequency of the signal on the lines 94–98 are equal to the square wave frequency divided by a respective factor of 1, 2, 3, 4 and 5.

The selecting logic circuit 38 includes five NAND gates 99, 100, 101, 102 and 103 having one input of each gate connected to the respective lines 94–98 from the binary counter circuit 36. The other input of the gates 99–103 are from the lines 90, 86, 85, 84 and 87 from the pulse mode logic circuit 44 controlling respectively a 2-pulse, 4-pulse, 6-pulse, 8-pulse or 10-pulse mode of operation. Each output of gates 99–103 are joined to a NAND gate 104 whose output is on point 38a. The reset circuit 44 comprises a single-shot multivibrator 105 whose input is from the point 38a. The complemented output of the multivibrator 105 drives the reset terminals of the J-K flip-flops 91–93 and also the regulator device 60 via a NAND gate 106 on respective lines 46 and 47. The multivibrator 105 also drives the clock pulse or CP terminals of the J-K flip-flops 73–76 of the logic circuit 40 via line 48.

Figure 5:
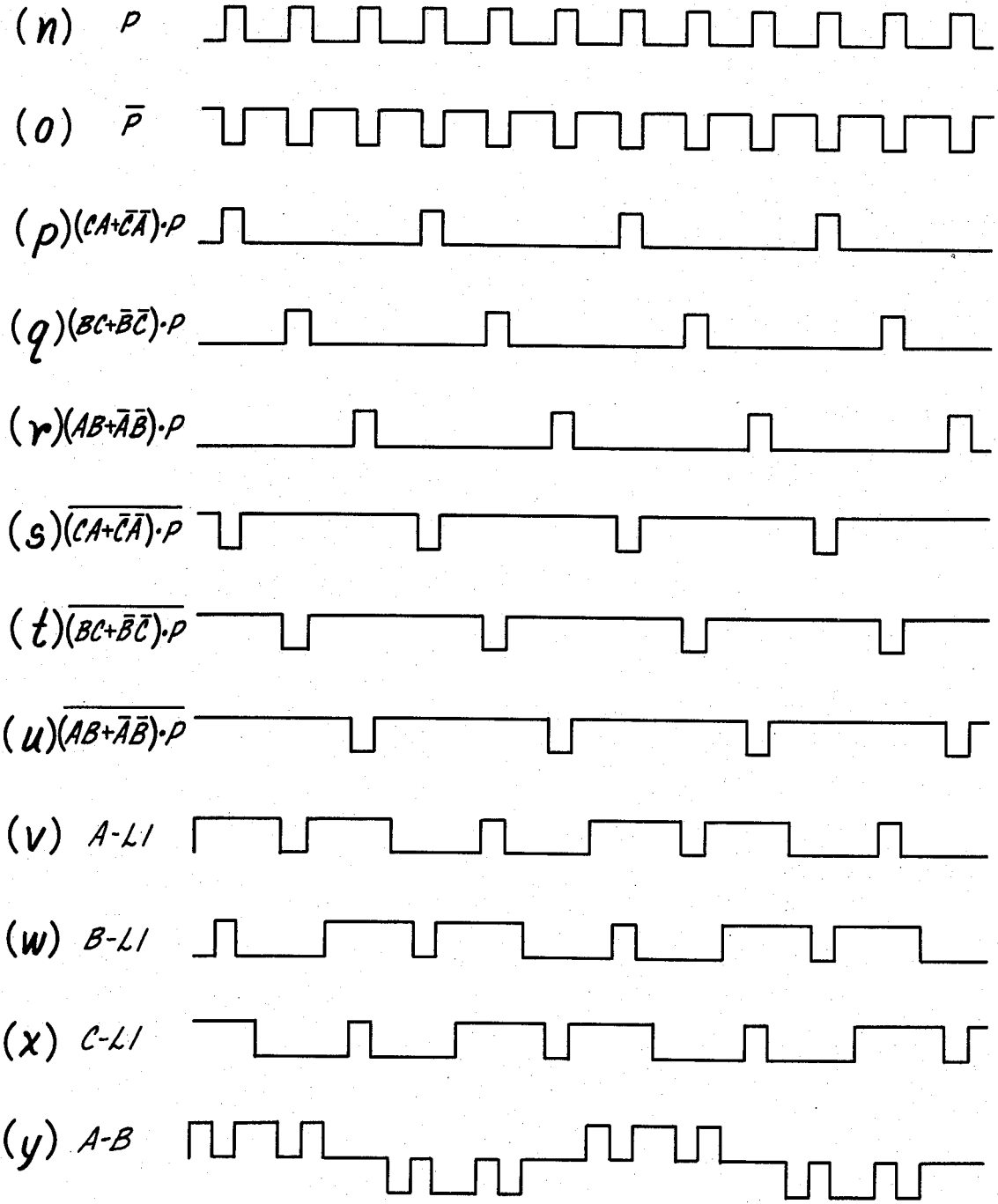

The square wave generator 50 is formed of three J-K flip-flops 107–109 whose clock pulse or CP inputs are from the point 38a. The output of the flip-flops 107–109 are on respective lines 110–115. The output waveforms at the lines 110, 111 and 112 represent the unmodulated square wave gate signals for the rectifiers Q1–Q3 which are displaced 120° in phase from each other and as shown in FIG. 5(a)–5(c). The output waveforms at the lines 113, 114 and 115 represent the unmodulated square wave gating signals for the rectifiers Q4–Q6 which are complements of the respective waveforms on lines 110–112 and as shown in FIG. 5(d)–5(f).

Figure 9:
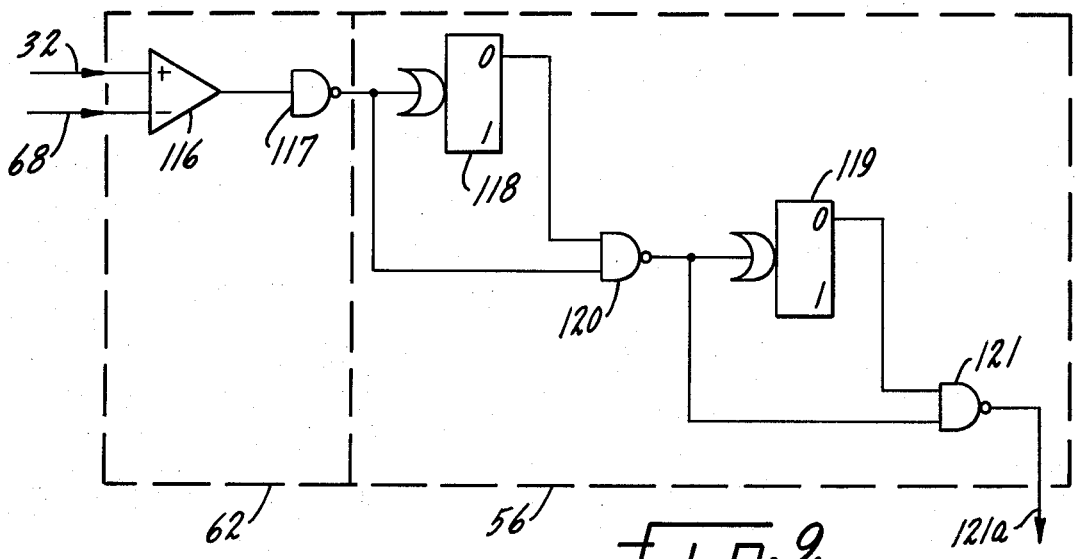

In FIG. 9, there is shown a preferred embodiment of the voltage comparator circuit 62 and the pulse generator 56. The comparator circuit includes an operational amplifier 116 having the variable control voltage signal from the regulator device 60 applied to its inverting input via line 68. The second or non-inverting input to the amplifier 116 is the triangular waveform from the oscillator via line 32. The comparator circuit 62 includes a NAND gate 117 which is interconnected between the amplifier 116 and the input to the pulse generator 56. The pulse generator 56 functions as a pulse shaper which consists of two single-shot multivibrators 118, 119 and two NAND gates 120, 121 which controls the preselected minimum allowable width of the pulse of pulses to be added to the middle 60° portion of each half cycle at the inverter output. In the present art of solid-state switching devices, the minimum width is set so as to ensure safe commutation thereby avoiding inverter failure. The output of the pulse generator 56 is on line 121a for connection to the input of the gating logic circuit 54.

Figure 10:
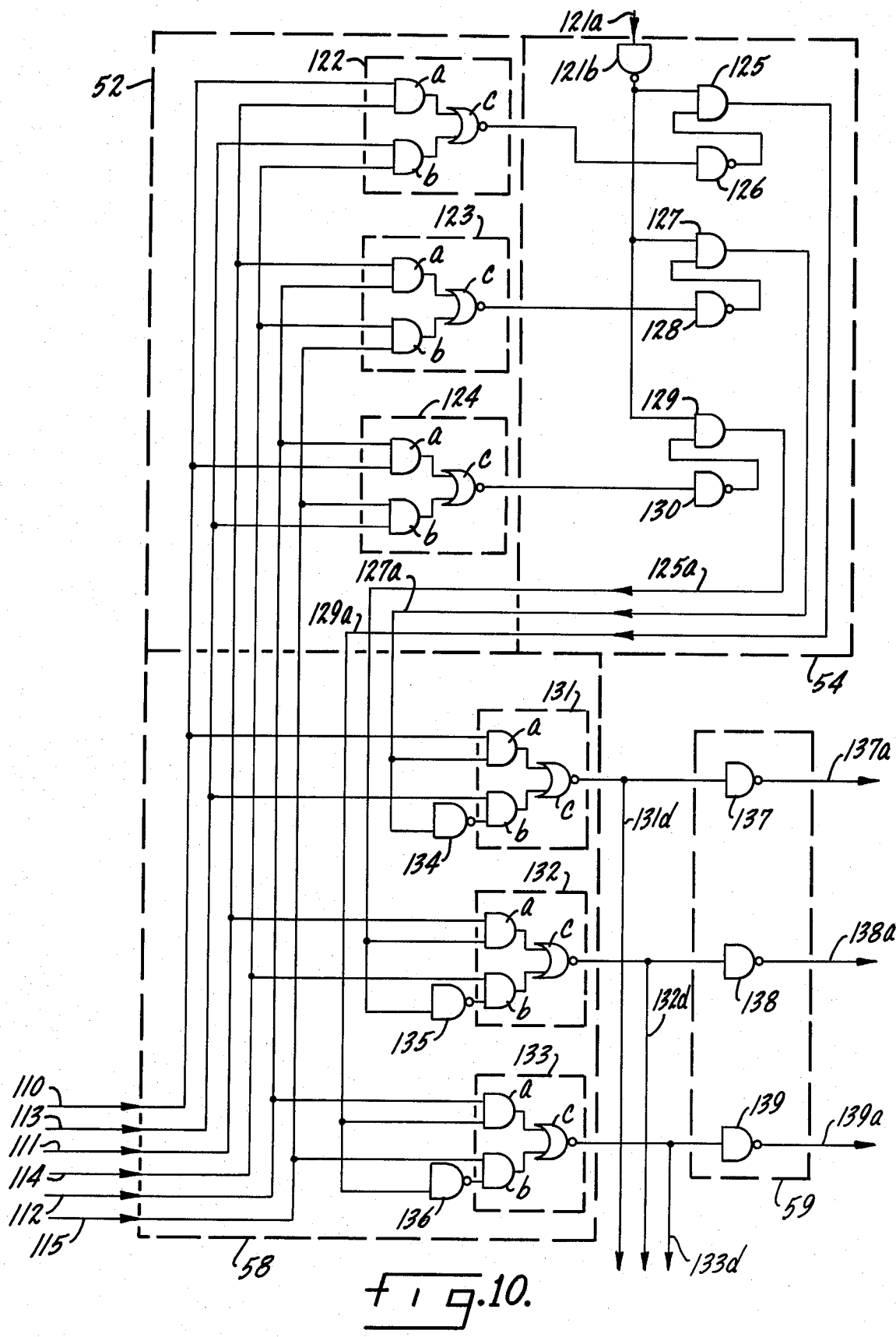

The phase/timing logic circuit 52, the gating circuit 54, the adder logic circuit 58 and the inverter circuit 59 are shown in more detail in FIG. 10 which illustrates a preferred embodiment of the present invention. The logic circuit 52 comprises three combination AND/NOR gates 122, 123 and 124, and the gating circuit 54 comprises three AND gates 125, 127 and 129 and three NAND gates 126, 128 and 130. One of the inputs for the gates 125, 127 and 129 and from the pulse generator 56 via line 121a and gate 121b, and the other inputs are from the respective gates 126, 128 and 130. The inputs for the gates 126, 128 and 130 are from the outputs of the respective gates 122c, 123c and 124c. The output from the gates 125, 127 and 129 on respective lines 125a, 127a and 129a are coupled to the input of the adder logic circuit 58. The four inputs of each of the AND/NOR gates 122-124 are taken from sets of four of the six lines 110 through 115 from the square wave generator 50. It can thus be seen that the four inputs to the gate 122 are lines 110, 111, 113 and 114; the four inputs to gate 123 are lines 111, 112, 114 and 115; and the four inputs to 124 are lines 112, 110, 115 and 113.

The adder logic circuit 58 comprises three AND/NOR gates 131, 132 and 133 are three NAND gates 134-136 whose four inputs are from the square wave generator 50 and the gating circuit 54. Thus, the four inputs to gates 131 and 134 are lines 110, 127a, 113 and 127a; the four inputs to gates 132 and 135 are lines 111, 125a, 114 and 125a; and the four inputs to gates 133 and 136 are lines 112, 129a, 115 and 129a. The output of the gates 131c–133c are the respective triggering gate signals for the SCRs Q1, Q2 and Q3 via lines 131d, 132d and 133d. The complement of these latter signals are obtained through NAND gates 137, 138 and 139 forming the inverter circuit 59. The output signals from the inverter circuit 59 are on lines 137a, 138a and 139a for triggering the gates of the SCRs Q4, Q5, and Q6.

In order to better understand the invention, the detailed operation of the logic schematic diagrams just described with reference to FIGS. 7 through 10 will now be explained. The control voltage from the regulator 60 is applied via the line 68 to the non-inverting inputs of the operational amplifiers 64-67 which are pre-biased at set points by the potentiometers ZP1 through 4. The control voltage is a D.C. signal which increases continously as the fundamental frequency of the inverter decreases. Assume that this control voltage is less than 1 volt or the setting of V1 applied to the inverting input of the amplifier 64. In this condition, the operation of the motor is at its slowest speed and the highest number of pulses that can be added to the inverter output will be controlling. Thus, the 10-pulse mode will be in operation in which the signal from the line 98 from the binary counter 36 comes in on the first input of input of the NAND gate 103. Only the output signal from the gate 103 will be allowed through to the gate 104.

Prior to the first change in pulse mode operation, the following logic condition exist: the output of the operational amplifier 64 will be at logic "0", the buffer 69 at logic "1", the Q1 output of the flip-flop 73 at logic "1", and the $\overline{Q1}$ output of the flip-flop at logic "0". Now as the control voltage exceeds the set point of V1 for a first pulse mode change, the operational amplifier 64 will change state to that of logic "1". This, in turn, changes the buffer 69 to a logic "0" condition. Assuming that a signal is present on the clock terminal to the J-K flip-flop 73, the $\overline{Q1}$ output will change to the logic "0" and the $\overline{Q1}$ output will be at logic "1". It is noted that the outputs of the flip-flops 73-76 change only when there is a clock pulse which occurs at the end of a 60° interval on the line 48 from the reset circuit 44. As the control voltage increases, operational amplifiers 65-67 will operate in the like manner to control their respective buffers 70-72 and flip-flops 74-76 when there is a clock pulse. Prior to the first pulse mode change, it will be observed that the output of lines 90, 81, 82 and 83 will at logic "1" and the output on line 88 will be at logic "0". Since the oscillator 30 responds only to a logic "0" condition, the oscillator 30 will be caused to generate an output with a frequency of thirty times the inverter output frequency F as preset by the control source 28. Therefore, at the first pulse mode change the line 88 changes from logic "0" to logic "1" and the line 81 changes from logic "1" to logic "0" thereby causing the oscillator 30 to run at twenty-four times the inverter output frequency. At each succeeding pulse mode change, the lines 82, 83 and 90 progressively change to a logic "0" condition thereby causing the oscillator 30 to run at respective 18, 12 and 6 times the inverter output frequency.

The successive switching of the input lines 88, 81, 82, 83 and 90 to the oscillator 30 from the logic "1" to logic "0" has the effect of altering the resistance in the oscillator and thus the value of its input voltage for controllings its output frequency. As is well known to those skilled in the art, this is the definition of a voltage-control oscillator. In a similar manner, the input lines 87, 84, 85, 86 and 90 to the gates 99 through 103 are all at logic "0", except for the line 87 which is at logic "1" prior the first pulse mode change. Thus, as previously stated only the signal on the line 98 from the binary counter 36 will be passed through to the output of the gate 104 via gate 103. The signal on line 98 is equal to the frequency of the oscillator 30 divided by a factor of five or 6 F which also appears at the point 38a. As each of the input lines 84, 85, 86 and 90 are progressively changed to logic "1", the signals on the respective lines 97, 96, 95 and 94 are passed through respective gates 102, 101, 100 and 99 to the gate 104. The signals on the lines 97, 96, 95 and 94 are equal to the frequency of the oscillator divided by a respective factor of four, three, two and one so that the frequency at the point 38a is always equal to 6 F.

In order to allow changes in the pulse mode operation in a controlled manner, the pulse modes are permitted to change only at the end of each 60° interval of the inverter output. This is accomplished by the one-shot multivibrator 105 having one output acting as a transfer signal on the line 48 connected to the clock pulse terminals of the flip-flops 73-76. The signal on line 48 is in the form of pulses of a relatively short duration occurring at the rate of six per cycle of the modulation frequency F or one pulse for every 60° interval of the modulation frequency. The other output of the multivibrator 105 is connected via line 46 to the reset terminals of the flip-flops 91-93 in the counter 36 for synchronizing the flip-flops to the modulation frequency. When a pulse mode change from one mode to another mode is required, it can only occur at the beginning of a 60° interval of the modulating cycle when the clock pulses are present allowing the flip-flops 73-76 to change state.

The operational amplifier 116 receives the triangular wave 32a of FIG. 4(a) on its one input and compares it with the D.C. control voltage applied to its other input. The control voltage is illustrated by a straight line 140 in the FIG. 4(a). The square wave from the oscillator 30 is at the same frequency as the triangular wave and is in phase relationship as shown in FIG. 4(b). When the peak amplitude of the triangular wave 32a exceeds the level of the control voltage 140, an output signal is produced at the operational amplifier 116 whose waveform is a train of pulses 142a as shown in FIG. 4(c). The width of the individual pulses is controlled by this control voltage which increases as a function of the inverter output frequency. It will be noted that the pulses 142a in the train will become narrower as the inverter output frequency increases and thus increases the effective output voltage for efficient motor operation, i.e., constant volts per Hz. The one-shot multivibrators 118, 119 insure that the pulses to be added to the inverter output are not less than a predetermined minimum width. In other words, the minimum time between successive commutations of the SCRs are limited to be not less than predetermined minimum value so as to avoid inverter failure where the SCRs fail to commutate.

In order to generate the timing signals for controlling the proper time in each phase when a pulse or pulses are to be added, the unmodulated phase A output from the square wave generator 50 on line 110 as shown in FIG. 5(a) is applied to one input of the NAND gate 122a of the logic circuit 52 and the unmodulated phase B output from the generator circuit 50 on line 111 as shown in FIG. 5(b) is applied to the other input of the gate 122a. Similarly, the complement of the unmodulated phase A or phase $\overline{A}$ shown in FIG. 5(d) is applied via line 113 to one input of the NAND gate 122b and the complement of the phase B or phase $\overline{B}$ shown in FIG. 5(e) is applied via line 114 to the other input of the gate 122b. The unmodulated phase C output from the generator 50 on line 112 is shown in FIG. 5(c), and the unmodulated phase $\overline{C}$ from the generator 50 on line 115 is shown in FIG. 5(f). By Boolean logic, it can be shown that the output of the NOR gate 122c may be represented by $AD+\overline{AB}$. The signal AB is represented by the waveform shown in FIG. 5(g) and the signal $\overline{AB}$ is represented by waveform shown in FIG. 5(h).

In similar fashion, the output from the gate 123a is BC and is represented by the waveform shown in FIG. 5(i); the output from the gate 123b is $\overline{BC}$ and is represented by the waveform shown in FIG. 5(j); the output from the gate 124a is $\overline{CA}$ and is represented by the waveform shown in FIG. 5(k); and the output from the gate 124b is CA and is represented by the waveform shown in FIG. 5(m). Using Boolean logic again, the output of the NOR gate 123c is $BC+\overline{BC}$ and the output of the NOR gate 124c is $CA+\overline{CA}$.

For permitting one or more pulses from the pulse generator 56 to be gated to the appropriate phase at the correct times, the gating logic circuit 54 consisting of gates 125-130 combines the various waveforms from the phase/timing logic circuit 52 with the one or more pulses from the generator 56. The pulses from the operational amplifier 116 are designated by P and is represented by the waveform shown in FIG. 5(n) for a 2-pulse mode. Since the pulse generator 56 reverses this logic condition, the output on line 121a is designated by $\overline{P}$ and is represented by the waveform shown in FIG. 5(o). The NAND gate 121b has also the P output as shown in FIG. 5(n). It is noted that the NAND gates 126, 128 and 130 reverse the logic condition for the respective gates 122c, 123c and 124c. Thus, the output from the gating logic circuit 54 on lines 125a, 127a and 129a can be shown by Boolean logic to be $(CA+\overline{CA})\cdot P$, $(BC+\overline{BC})\cdot P$, and $(AB+\overline{AB})\cdot P$, respectively. The signal $(CA+\overline{CA})\cdot P$ is obtained by combining the waveforms of FIGS. 5(k), 5(m) and 5(n) and is shown in FIG. 5(p). The signal $(BC+\overline{BC})\cdot P$ is obtained by combining the waveforms of FIGS. 5(i), 5(j) and 5(n) and is shown in FIG. (q). The signal $AB+\overline{AB})\cdot P$ is obtained by combining the waveforms of FIG. 5(g), 5(h) and 5(n) and is shown in FIG. 5(r).

For generating the modulated gate signals for triggering the SCRs Q1, Q2 and Q3 in the respective phases A, B and C of the inverter, the adder logic circuit 58 sums the one or more pulses to be added from the generator 56 to the unmodulated triggering signals from the square wave generator 50. To accomplish this logic function, the gate 131a has on its input the unmodulated phase A signal via line 110 and the gate 131b has on its one input the unmodulated phase A signal via line 113. Also, the gate 131a has on its other input the signal from the line 127a and the gate 131b has on its other input the complement of the signal from the line 127a as being reversed by NAND gate 134. Similarly, the gate 132a has on its one input the unmodulated phase B signal via line 111 and the gate 132b has on its one input the unmodulated phase $\overline{B}$ signal via line 114. Also, the gate 132a has on its other input the signal from the line 125a and the gate 132b has on its other input the complement of the signal from the line 125a as reversed by NAND gate 135. Further, the gate 133a receives inputs from the unmodulated phase $\overline{C}$ via line 112 and the signal from the line 129a, and the gate 133b receives inputs from unmodulated phase C via line 115 and the complement of the signal from the line 129a as reversed by NAND gate 136. The complement of the signals on lines 125a, 127a, and 129a at the output of gates 134, 135 and 136 are shown in respective FIGS. 5(s), 5(t) and 5(u).

By using Boolean logic once again, it can be shown that the modulated gate signal for triggering the SCR Q1 (FIG. 1) in phase A at the output of the rate 131c via line 131d to be $A\cdot[BC+\overline{BC})\cdot P]+\overline{A}\cdot[\overline{BC+\overline{BC})\cdot P}]$ and is represented by the waveform in FIG. 5(v) which is a combination of the waveforms in FIGS. 5(a), 5(q), 5(d) and 5(t). The waveform 5(v) represents the phase A voltage at the terminal A of the pulse-width modulated inverter. In a similar manner, the phase B voltage at the terminal B of the modulated inverter is equal $\overline{B}\cdot[(CA+\overline{CA})\cdot P]+B\cdot[\overline{CA+\overline{CA})\cdot P}]$ and is represented by the waveform in FIG. 5(w) which is a combination of the waveforms in FIGS. 5(b), 5(p), 5(e) and 5(s). The phase C voltage at the terminal C of the inverter is equal to $C\cdot[(AB+\overline{AB})\cdot P]+\overline{C}\cdot[\overline{(AB+\overline{AB})\cdot P}]$ and is represented by the waveform FIG. 5(x) which is a combination of the waveforms and FIGS. 5(c), 5(r), 5(f) and 5(u). The voltage A-B, that is, the line-to-line voltage is shown in FIG. 5(y). The other line voltage B-C and C-A, which are not shown, are similar but phase shifted 120° and 240° from the voltage A-B. It will be noted that the waveform shown in FIG. 5(v), (w), (x) and (y) are identical to the waveforms shown in FIG. 3(a)-3(d) for a 2-pulse mode operation.

FIG. 4(d) shows the narrow width transfer pulses on the line 48 applied to the CP terminals of the flip-flops 73-76 for permitting a pulse mode change only at the beginning of a 60° interval of the inverter output. FIG. 4(e) shows the narrow pulse on the line 46 applied to the reset terminals of the flip-flops 91-93. FIG. 4(f) shows the triangular output waveform from the oscillator 30 with the frequency of one times 6 F for a 2-pulse mode operation with the control voltage illustrated by the dotted line 144. FIG. 4(g) shows the triangular output waveform of the oscillator 30 with a frequency of two times 6 F or 12 F for a 4-pulse mode operation with the control voltage illustrated by the dotted line 144. (FIG. 4(h) shows the transition at the output of the oscillator 30 at the time of the transfer pulse on the line 48 from the 2-pulse mode operation to 4-pulse mode operation (6 F to 12 F) at the transition point 146 with the control voltage illustrated by the dotted line 144. FIG. 4(i) shows the transition at the output of the generator 56 on the line 121a. It should be noted that the control voltage 144 before and after the pulse mode change is the same and the total widths of the pulses before and after the switch are equal so as to maintain constant the fundamental voltage. The phase voltages for the phases A, B and C are shown at the transition in FIGS. 4(j), 4(k) and 4(m), respectively. It can be seen that the added pulse or pulses are symmetrically disposed about the 90° point in the middle 60° portion of each half cycle for the respective phases. The line-to-line voltage A-B are shown at the transition in FIG. 4(n). The other line voltages B-C and C-A, which are not shown, are similar but only shifted in phase by 120° and 240° from the voltage A-B.

From the foregoing description, it can be seen that the present invention provides a new and improved pulse-width modulated inverter system and method wherein the output waveforms of the inverter are modulated by adding a single pulse of a minimum allowable width which is disposed symmetrically about the 90° point in the middle 60° portion in each half cycle of the output waveform at the highest inverter output frequency and maximum output voltage so as to minimize the commutation rate and switching looses. That is, if the highest output frequency is 60 HZ at 240 volts output, then only one pulse for each half cycle is added. As the preselected output frequency is reduced, the number of pulses added in the middle 60° portion is automatically and continuously increased by a pulse mode logic device responsive to a control signal having a value which is a function of the preselected output frequency, thereby avoiding excess motor heating due to increased low order harmonics. It should be clearly understood that while the present invention has been described for operation in five different pulse modes any desired operation having more than five pulse modes could be effected by minor changes in the various logic circuitry by those skilled in the art.

While there has been illustrated and described what is at present to a preferred embodiment of the present invention, it will be understood by those skilled in the art that there various changes and mofidications may be made and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out this invention but the invention will include all embodiments falling within the scope of the appended claims.

What is claimed is:

1. A pulse-width modulated inverter system for providing three-phase power to a load at a preselectable output frequency and a preselectable output voltage, said inverter system including voltage control apparatus comprising in combination:
   a power supply having positive and negative supply terminals;
   switching means for operatively connecting said power supply to a load having A, B and C output terminals; and
   modulated control means for activating said switching means to produce waveforms at said output terminals having at least one pulse of a variable width disposed symmetrically about the center point and only in the middle 60° portion in each half cycle thereof.

2. A pulse-width modulated inverter system as claimed in claim 1, wherein said control means includes pulse mode means for selecting and changing the number of pulses to be in said middle 60° portion in each half cycle of said waveforms in response to a control signal having a value which is a function of the preselected output voltage and frequency.

3. A pulse-width modulated inverter system as claimed in claim 2, wherein said control signal is a D.C. voltage which changes continuously as the fundamental output frequency of the inverter is changed.

4. A pulse-width modulated inverter system as claimed in claim 3, further including comparator means for generating the pulses to be added and for varying the widths of said pulses to be added in response to said D.C. voltage so that the widths are variable thereby obtaining the preselected output voltage.

5. A pulse-width modulated inverter system as claimed in claim 2, further including oscillator means responsive to said pulse mode means for generating output signals having a frequency which is an integer multiple of six times the inverter output frequency.

6. A pulse-width modulated inverter system as claimed in claim 5, wherein said output signals from said oscillator means comprises a square wave output and a triangular wave output.

7. A pulse-width modulated inverter system as claimed in claim 6, further including frequency divider means connected to the square wave output of said oscillator means for generating a plurality of output signals at frequencies divided by a factor of one, two, three, four and five with respect to the oscillator frequency.

8. A pulse-width modulated inverter system as claimed in claim 7, wherein said frequency divider means comprises a divide-by-N counter formed of a plurality of flip-flops.

9. A pulse-width modulated inverter system as claimed in claim 7, further including selecting means for choosing one of said plurality of output signals from said frequency divider means whose frequency is equal to six times the modulation frequency.

10. A pulse-width modulated inverter system as claimed in claim 9, further including square wave generator means connected to the output of said selecting means for generating unmodulated gating signals of a three-phase waveform for said switching means.

11. A pulse-width modulated inverter system as claimed in claim 10, further including phase/timing means connected to said square wave generator means for determining the proper times in each phase in which to add the pulses to be added.

12. A pulse-width modulated inverter system as claimed in claim 11, wherein said comparator means includes an operational amplifier which receives said D.C. voltage on its one input and said triangular wave output of said oscillator means on its other input to develop the pulses to be added when said triangular wave output exceeds said D.C. voltage.

13. A pulse-width modulated inverter system as claimed in claim 12, further comprising pulse shaper means connected to said operational amplifier for ensuring the pulses to be added have a minimum allowable width.

14. A pulse-width modulated inverter system as claimed in claim 13, further including gating means operatively connected to said phase/timing means and said pulse shaper means for permitting the pulses to be added to be gated to the appropriate phases at the correct times.

15. A pulse-width modulated inverter system as claimed in claim 14, further including adder means operatively connected to said square wave generator means and said gating means for summing the pulses to be added from said pulse shaper means to be unmodulated gating signals from said square wave generator means to generate modulated gating signals.

16. A pulse-width modulated inverter system as claimed in claim 2, further comprising reset means for generating a transfer signal to said pulse mode means to allow a change in pulse mode operation only at the end of each 60° interval of the output frequency.

17. A pulse-width modulated inverter system as claimed in claim 4, wherein said pulse mode means is operated in a 2-pulse mode manner so that only a single pulse with the narrowest allowable width is added to each half cycle of said waveforms at said output terminals at the highest preselectable output frequency.

18. A pulse-width modulated inverter system as claimed in claim 17, wherein said comparator means is operated so that the pulse-width of said single pulse is increased continuously as the preselectable output frequency is decreased for reducing the output voltage until a preselected limit is reached and whereupon said pulse mode means is switched automatically to operate in a 4-pulse mode manner with two pulses being added to each half cycle of said waveforms at said output terminals, the total widths of the pulses before and after the switching being equal so as to maintain constant the fundamental of the output voltage.

19. A pulse-width modulated inverter system as claimed in claim 18, wherein said pulse mode is switched automatically and continuously to a higher pulse mode operation as the preselectable output frequency is further reduced.

20. A method for operating a pulse-wdith modulated inverter system to provide three-phase power to a load at a preselectable output frequency and a preselectable output voltage, said method comprising the steps of:
providing a power supply having positive and negative supply terminals;
connecting switching means between said power supply and a load having A, B, and C output terminals; and
activating said switching means to produce waveforms at said output terminals having at least one pulse of a variable width disposed symmetrically about the 90° point and only in the middle 60° portion in each cycle thereof.

* * * * *